United States Patent [19]

Dagna

[11] Patent Number: 4,593,296

[45] Date of Patent: Jun. 3, 1986

[54] INK JET PRINTER WITH GAS EVACUATING ARRANGEMENT

[75] Inventor: Giandomenico Dagna, Ivrea, Italy

[73] Assignee: Ing. C. Olivetti & C., S.p.A., Ivrea, Italy

[21] Appl. No.: 631,950

[22] Filed: Jul. 18, 1984

[30] Foreign Application Priority Data

Jul. 20, 1983 [IT] Italy .............................. 67783 A/83

[51] Int. Cl.[4] .............................................. G01D 15/16

[52] U.S. Cl. ................................................ 346/140 R

[58] Field of Search ............ 340/140 PD, 140 R, 139, 340/75

[56] References Cited

U.S. PATENT DOCUMENTS

| | | | |
|---|---|---|---|
| 4,320,406 | 3/1982 | Heinzl | 346/140 PD |
| 4,403,227 | 9/1983 | Bertschy | 346/75 |
| 4,463,362 | 7/1984 | Thomas | 346/140 PD |

*Primary Examiner*—E. A. Goldberg

*Assistant Examiner*—Mark Reinhart

*Attorney, Agent, or Firm*—Banner, Birch, McKie & Beckett

[57] ABSTRACT

An ink jet printer has a chamber for the evacuation of gases which form during the printing operation, the chamber having an associated Venturi pump acting as a vacuum source.

The electrical energization circuit for the printer includes an adjustment member for effecting controlled variation in the energy of the pulses which cause the ejection of ink sprays through the printer nozzles.

12 Claims, 12 Drawing Figures

INK JET PRINTER WITH GAS EVACUATING ARRANGEMENT

Figure 1:
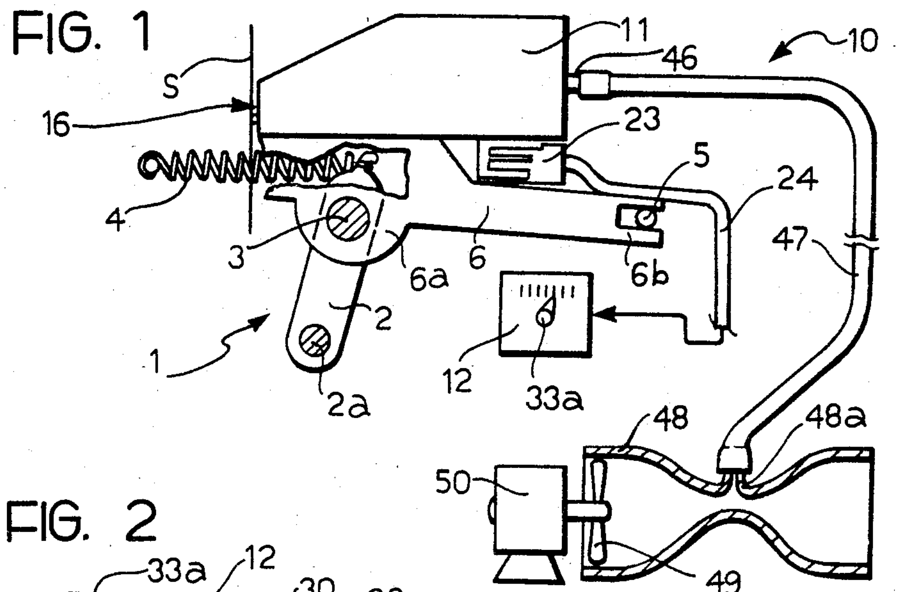

The present invention relates to ink jet printers and particularly to an ink jet printer including a reservoir for electrically conductive ink, at least one capillary nozzle for ejecting the ink communicating with the reservoir, a first electrode in contact with the conductive ink, a second electrode located in correspondence with the outlet end of the nozzle and an electrical energisation circuit for applying a voltage pulse between the electrodes for causing the ejection of ink droplets through the nozzle.

A printer of the type specified above is described in greater detail in U.S. Pat. No. 4,502,054, assigned to the same Assignee as the present invention, the description of which is incorporated herein as a reference.

In the printer described in this application, gas bubbles having a diameter of 0.1–0.2 mm are formed at the end of the nozzle facing towards the reservoir, it being necessary to evacuate these in order to avoid pneumatic over-pressurising within the reservoir causing an alteration in the pressure conditions within the nozzle, with consequent harmful results with regard to the quality of the printing.

In the Patent mentioned above, and also in the U.S. Pat. No. 4,536,776 also assigned to the same assignee as the present invention, which relates to a printer with several nozzles, the gas bubbles which form during the printing are evacuated by the establishment of a continuous ink flow into the region located adjacent the end of the nozzle facing inwardly of the reservoir.

This solution, although being completely satisfactory from a functional point of view, is rather complicated and difficult to achieve, particularly when there are several nozzles for printing in different colours, bearing in mind that the printing device is generally a movable device mounted on a carriage which moves at high speed across the printing surface.

In another U.S. Pat. No. 4,503,443 also assigned to the same Assignee of the present invention, the reservoir has an expansible space formed by a sac membrane and a compression spring which tends to expand the space. The reservoir is filled with ink which keeps the spring compressed. During the printing process, the spring expands, maintaining a low pressure within the ink continuously so as to allow the formation of a concave ink meniscus within the nozzle.

This solution although perfectly good from a functional point of view nevertheless creates several problems of bulk, having regard to the fact that the volume of the space which can expand under the action of the spring must correspond substantially to the overall volume of the gas produced in the form of bubbles during the printing process.

The object of the present invention is to provide a printer of the type specified above which does not have the disadvantages described above and which can be made simply and economically on an industrial scale.

This object is achieved according to the present invention by virtue of a printer of the type specified above characterised in that the reservoir has an aperture above the free surface of the ink which communicates with a gas evacuation chamber.

In application to printing in several colours, the reservoir of the printer includes a plurality of separate compartments, liquid-tightly sealed from each other, each of which is filled with an ink of different colour. In this case a single evacuation chamber is provided for the gases and each of the compartments has an aperture above the free surface of the ink communicating with the evacuation chamber.

In a preferred embodiment, the pump member acting as a vacuum source includes a Venturi diffuser, a flow generator for generating a flow of gases through this diffuser and a duct connecting the throat section of the diffuser to the gas evacuation chamber.

Another object of the present invention is a printer of the type specified above in which the electrical energisation circuit includes an adjustment member which can cause a controlled variation in the energy of the voltage pulses applied to the electrodes in order to graduate selectively the intensity of the ink sprays ejected by the printing device.

By virtue of this characteristic, a printer is provided in which the width of the dots applied to the printing surface may be graduated selectively to obtain variable intensity printing, for example to achieve heavy type effects or to achieve a constant contrast in characters formed by dot matrices of different densities or definition.

With specific reference to colour printing, according to a preferred embodiment, the printer includes a reservoir with a plurality of separate compartments liquid-tightly sealed from each other, each of which is filled with an ink of a different colour, the nozzles are aligned in the direction of printing of the printer, and each of them communicates exclusively with one of the compartments. The different nozzles are actuated sequentially so as to achieve the ejection of ink sprays of different colours in correspondence with a single printing region in order to achieve printing in this region with a colour achieved by the chromatic synthesis of the colours of the inks ejected by the nozzles.

A further subject of the present invention is a printer of the type specified above characterised in that it includes a plate element defining a wall portion of the reservoir for the ink, with a laminar substrate of rigid insulating material having a thickness substantially equal to 0.2 mm, which can reduce the electrical resistance of the ink in the nozzle.

With specific reference to high speed black and white printing, the printer includes eight capillary nozzles arranged in an array comprising two parallel rows (columns) perpendicular to the printing direction, each row including four nozzles spaced apart at equal distances; the nozzles of the two rows are staggered relative to each other by a distance equal to half the said inter-nozzle spacing.

Preferably the rows or columns of nozzles are located at a distance of about 1.27 mm from each other while the spacing between the holes in each row is about 0.4 mm.

By virtue of this characteristic a printer is formed which can achieve a very high printing rate (500 characters/second) with a "draft quality" on a 7×5 dot matrix. With a similarly high printing rate (250 characters/second and 120 characters/second) it is possible to achieve "near letter quality" printing on a 16×9 dot matrix and an extremely high quality printing on a 32×24 dot matrix, that is 10 dot/mm, respectively.

Thus a printer is achieved which makes maximum use of the capacity for movement relative to the printing surface.

For this purpose, according to a preferred embodiment, partitions are provided in the ink reservoir for damping the inertial movements of the ink which are caused as a result of the movement of the printer itself during printing.

Figure 2:
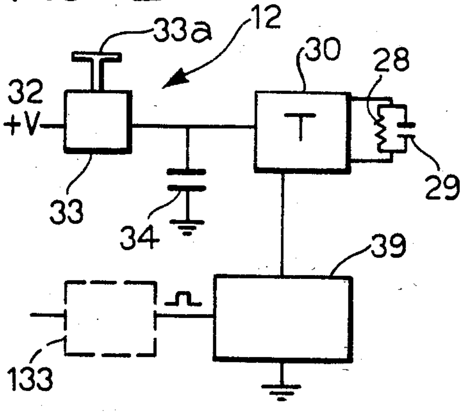
Figure 10:
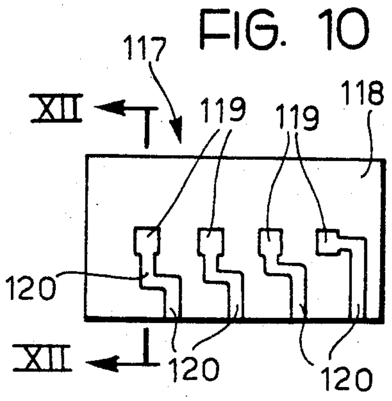
Figure 12:
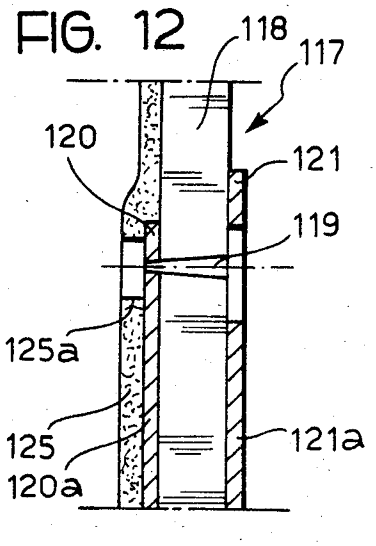
Figure 11:
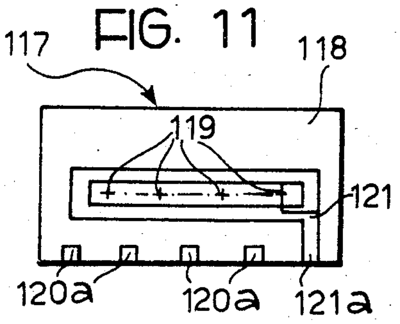
Figure 3:
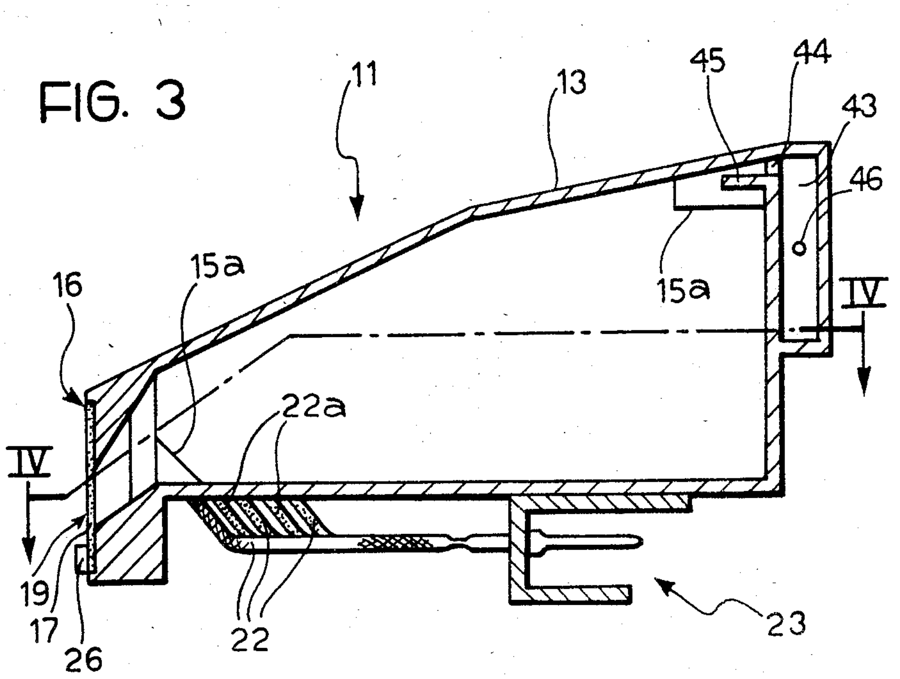
Figure 4:
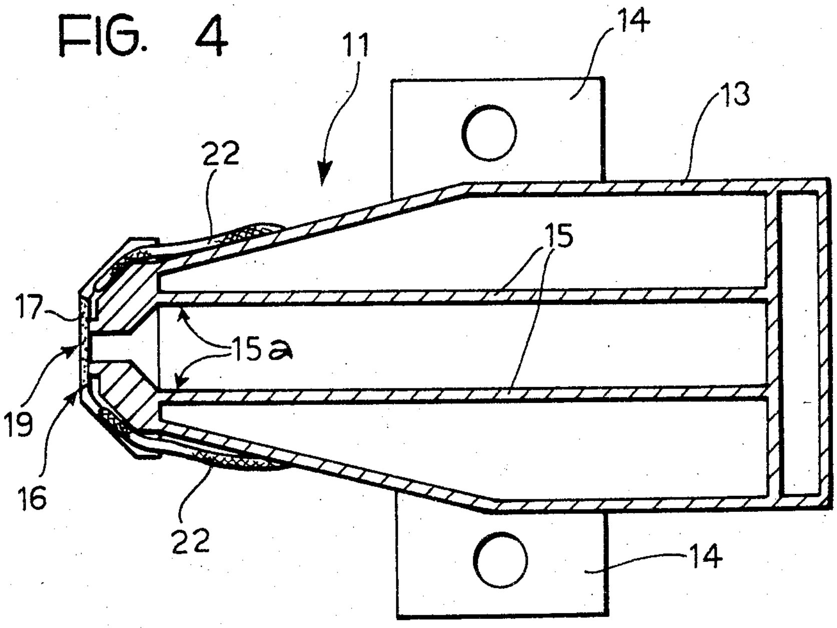
Figure 7:
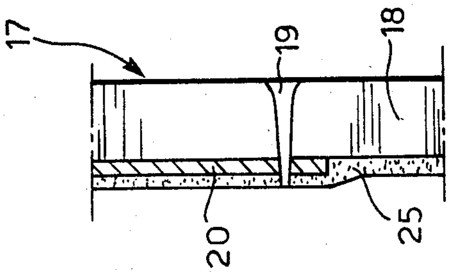
Figure 6:
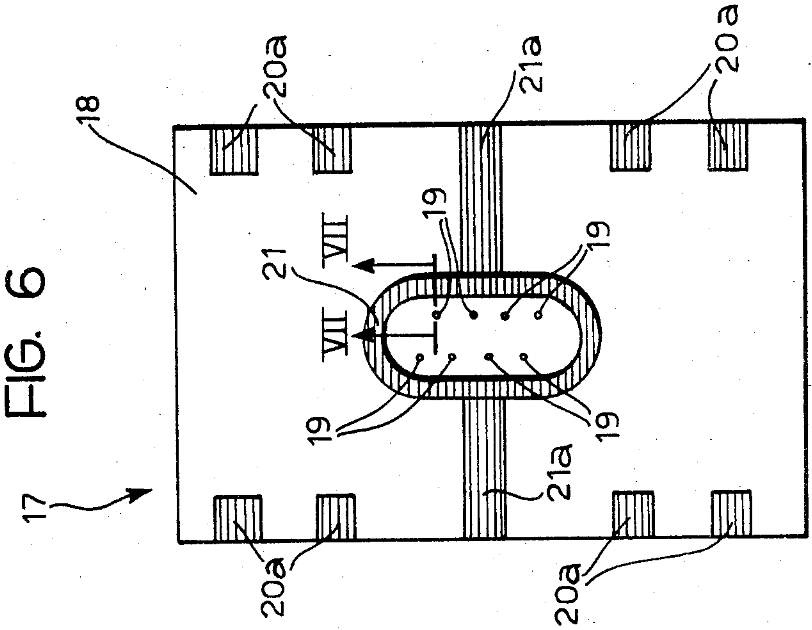
Figure 5:
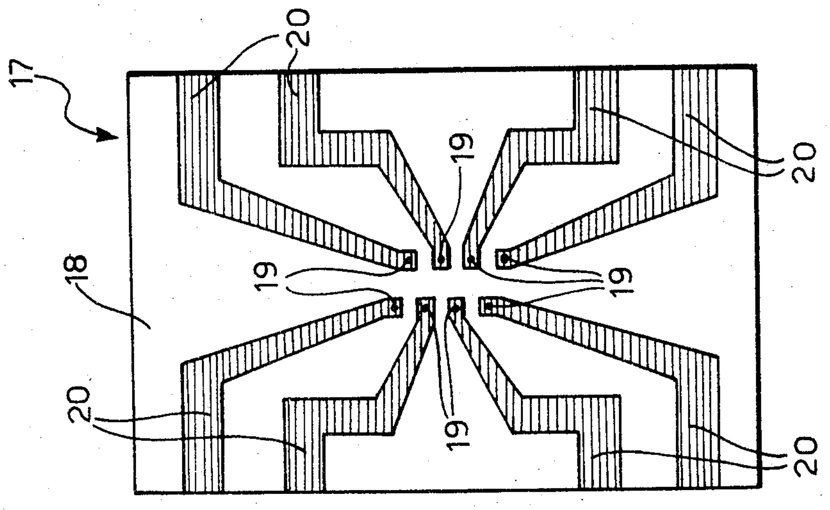
Figure 8:
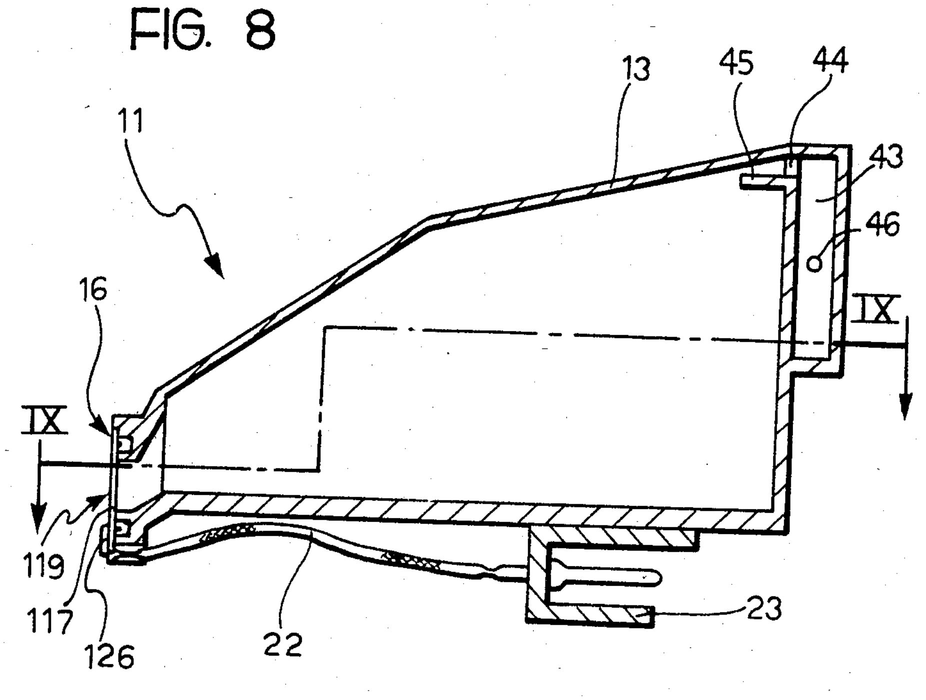
Figure 9:
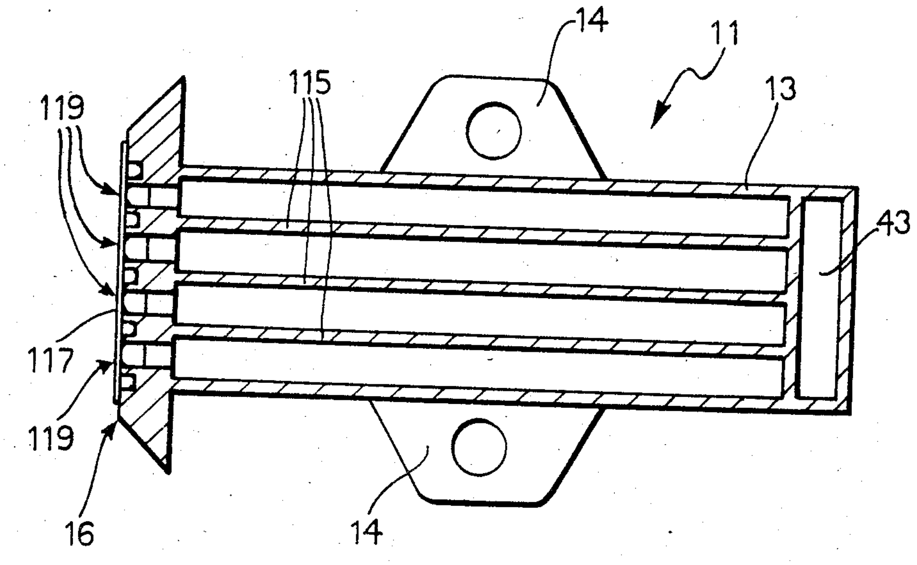

The invention will now be described, purely by way of non-limiting example, with reference to the appended drawings, in which:

FIG. 1 is a side elevational view illustrating schematically a printer according to the invention in its assembled disposition in a printing machine, FIG. 2 is a block diagram illustrating schematically a possible embodiment of an electrical energisation circuit for the printer of FIG. 1, FIG. 3 is a median vertical section illustrating schematically the structure of the printing element of a first embodiment of the printer according to the invention, developed with specific reference to monochromatic printing, FIG. 4 is a section taken on the line IV—IV of FIG. 3, FIGS. 5 and 6 illustrate the structure of one of the parts of the element of FIGS. 3 and 4 on an enlarged scale, FIG. 7 is a further enlarged section taken on the VII–VII of FIG. 6, FIG. 8 is a vertical median section through the printing element of another embodiment of the printer according to the invention, developed with specific reference to colour printing, FIG. 9 is a section taken on the line IX—IX of FIG. 8, FIGS. 10 and 11 illustrate schematically the structure of one of the parts of the element of FIGS. 8 and 9, and FIG. 12 is an enlarged section taken on the line XII—XII of FIG. 10.

FIG. 1 illustrates schematically, and partly in median vertical section, the structure of a printing machine such as a high speed printer associated with an electronic computer, a personal computer, a word processing system or an advanced technology writing machine. Reference S indicates schematically the printing surface, that is to say the support (normally constituted by a sheet of paper) on which it is wished to impress a graphical sign. This graphical sign, although it may assume different forms from simple alphanumeric characters, to graphs, histograms or symbols, in black/white or in colour, will be generically indicated by the term "printing" below.

A forked support structure is generally indicated 1 and includes two pivoted arms 2 (only one of which is visible in the drawings) each of which has an end 2*a* connected to one of the sides of the casing of the printing machine so as to be pivotable about a horizontal axis extending transverse the printing surface S.

The two pivoted arms 2 are connected together by a cylindrical cross member 3 constituting a sliding guide also extending transversely across the printing surface S.

The guide 3 is movable relative to the structure of the printer and is able to effect a contained movement of approach to the printing surface S under the action of a pair of springs 4 each of which has one end connected to the casing of the printer and the opposite end connected to the free end of one of the pivoted arms 2.

A further cylindrical guide 5 is fixed to the casing of the printer in a position substantially parallel to the guide 3.

A carriage 6 is movable longitudinally on the guides 3 and 5.

The carriage 6 has sleeve parts 6*a* fitted onto the guide 3. The connection with the guide 5 is on the other hand achieved by means of forked parts 6*b* located astride the guide 5 itself. The assembled disposition of the carriage 6 on the guides 3 and 5 is thus such that the carriage 6 slides longitudinally on the guide 3 but follows the guide 3 in its movement of approach to the printing surface S effected by the springs 4.

The carriage 6 has associated drive means of known type (not illustrated) which impart a rapid bidirectional sliding movement to the carriage on the guides 3, 5.

One of the elements (head) of a printer generally indicated 10, is firmly mounted on the carriage 6.

The head of the printer, indicated 11, is driven by the carriage 6 in its sliding movement along the guides 3 and 5 and can thus move at high speed across the printing surface S.

The head 11 has a plurality of nozzles which, under the effect of voltage pulses produced by an energisation circuit 12, project ink droplets at the surface S which form dots constituting elementary nuclei of the graphical sign (printing) which is transferred onto the surface S.

The head 11 functions on the basis of the principle described in U.S. Pat. No. 4,502,054 previously mentioned.

By way of summary, and with reference to the parts common to the embodiment illustrated in FIGS. 3 and 4 and to the embodiment illustrated in FIGS. 8 and 9, the head 11 includes a hollow body of insulating material, for example polyphenylenoxide or polycarbonate resin having tabs 14 for fixing it to the carriage 6.

The body 13 has a filling of electrically conductive ink.

The ink is constituted essentially by a solution of dyes in an electrically conductive liquid vehicle having a relatively small specific resistance, for example between 20 and 300 ohm. cm. The specific resistance of the solution may be reduced by the addition of a saline electrolyte such as a chloride or sulphate of lithium, magnesium or potassium. The dye may be of the acid or solvent type or of the direct type.

A detailed description of an ink composition which can be used in the printer according to the invention and method of preparation is contained in U.S. Pat. No. 4,502,054 mentioned above.

In the embodiment illustrated in FIGS. 3 and 4, which relate to a head for black and white printing, the body 13 defines a single reservoir chamber provided internally with partitions 15 for damping the inertial movements caused within the ink as a result of the strong accelerations imparted to the head 11 during the printing process as a result of the movement of the carriage 6.

The head 11 illustrated in FIGS. 8 and 9 is, however, intended for colour printing.

Again in this case, the body 13 has internal partitions 115 which define within the body separate liquid-tight compartments each of which is filled with different coloured ink.

In the embodiment illustrated, three partitions 115 are provided which define four liquid-tight compartments for receiving coloured inks having the colours red-magenta, yellow and cyan, and a black and white printing ink respectively.

The three colours indicated above correspond to the primary colours of a colour triangle and thus allow printing in any colour obtained by chromatic synthesis of these colours in addition to printing in each of these colours.

In both embodiments described, the body 13 has a tapered shape with a front or tip portion 16 which, in the assembled disposition of FIG. 1, faces the printing surface S.

The body 13 thus, has, so to speak, a generally drawn configuration converging towards the tip portion 16 at which the body 13 itself is closed by a front wall element generally indicated 17 in the embodiment of FIGS. 3 and 4 and 117 in the embodiment of FIGS. 8 and 9.

With specific reference to the embodiment of FIGS. 3 and 4, it can be seen in FIGS. 5 to 7 that the element 17 has a laminar structure and includes a substrate 18 of insulating ceramic material such as sintered alumina metallised on its opposite faces by a conventional silk screen printing process. The metallising forms conductive tracks for the application of energisation pulses to eight nozzles 19 disposed in an ordered array centrally of the wall element 17.

The nozzles 19 communicate with the interior of the body 13 and are thus filled with the ink contained therein.

As shown schematically in FIG. 7 and as will be better explained below, the nozzles 19 are made by piercing the wall element 17 by laser radiation. Each thus has a frusto-conical profile with end diameters typically of 30 microns and 120 microns. In order to reduce the energy needed for the printing, the electrical resistance of the ink in the nozzles 19 must be as small as possible. For this purpose the thickness of the wall element 17 is reduced to a minimum compatible with the structural strength thereof, typically to a value of the order of 0.2 mm.

The dimensions of the nozzles are such as to give rise to capillary phenomena within them by virtue of the conductive ink, which has a high surface tension of the order of 60–70 dynes/cm.

In the absence of external forces, the ink thus fills the nozzles stably without leaving the body 13.

The nozzles 19, which are intended to project ink sprays towards the surface S, forming printing dots on the said surface, are arranged in an array comprising two parallel rows, each of four nozzles, spaced apart by a distance of about 1.27 mm.

Each row comprises four nozzles spaced apart at equal intervals of about 0.8 m. The nozzles in the two rows are staggered relative to each other by a distance of about 0.4 mm, that is to say, a distance equal to half the distance between the nozzles 19 in each row.

The nozzles 19 are thus able to form up to eight printing dots on the surface S simultaneously.

A distance of 1.27 mm (1/20 inch) between the two rows of nozzles 19 corresponds to an integral multiple of the discrete elementary pitch adopted for strobe devices generally used in printing machines, that is to say, the minimum distance apart at which two rows of adjacent dots are printed simultaneously on the printing surface S.

The distance of about 0.8 mm (1/30 inch) between the nozzles in each row and the staggering of the nozzles in the two rows by 0.4 mm (1/60 inch) allows the printing of alphanumerical characters reproduced on the basis of a 7×5 dot matrix (draft quality).

The disposition of the nozzles 19 also allows the reproduction of alphanumerical characters in a 16×9 dot matrix in two passes, that is to say in two successive scans of the printing surface, between which the printing surface is advanced by a distance equal to half the staggering of the nozzles in the two rows.

In four successive passes, interspersed with advances of the printing surface by a quarter of the said staggering it is thus possible to achieve printing in a 10 point/mm (32×24) format. In addition to the reproduction of exceptionally clear alphanumeric characters (letter quality) this format allows the reproduction of graphical information such as symbols, labels, histograms etc.

If account is taken of the fact that the printing technique used in the present invention allows controlled ejection to be achieved with a frequency (drop rate) of about 12000 Hz, the printer according to the invention allows the printing of alphanumeric characters at a speed of 500, 250 and 120 characters per second respectively in the formats 7×5, 16×9 and 32×24 mentioned above.

One is considering very high printing speeds, such as to make full use of the speed of relative movement of the head 11 and the printing surface S.

With reference to the techniques at present used in the mechanisms and the advancing motors for high speed printers based, as previously described on the transverse movement of the head 11 relative to the surface S which advances gradually in a direction perpendicular to the direction of movement of the head, this speed reaches values of the order of 2 m per second.

In printers according to the known art, such as needle printers, the speed of movement of the head relative to the printing surface must, however, be limited to take account of the smaller speed of printing of the head 11 itself.

Turning to FIGS. 5 to 7, it is possible to see how metallising is provided on one surface of the substrate 18, more particularly on the surface intended to face the printing surface S, the metal coating being constituted by eight conductive tracks 20 obtained by silk screen printing or any other method generally used for the manufacture of hybrid electric circuits and integrated electronic circuits.

Each of the conductive tracks 20 extends from the edge of the substrate 18 towards one of the nozzles 9 in an arrangement such that each of the tracks 20, at its inner end, surrounds the outlet orifice of one of the nozzles 19.

The metal coatings 20 extend along paths which minimise the parasitic capacitive and mutual coupling effects.

On the opposite surface of the substrate 18 there is instead provided a metal coating 21 which extends along a closed path of substantially oval form and surrounds the array of nozzles 19.

The metal coating 21 is intended to come into contact with the conductive ink in the head 11. Both the metal coatings 20 and the metal coating 21 are provided with appendage portions indicated 20*a* and 21*a* respectively extending over the peripheral part of the substrate element 18 onto the surface provided with the metal coating 21.

These appendage portions define contact surfaces for a plurality of energisation cables generally indicated 22 in FIGS. 3 and 4.

Cables 22 terminate at a disconnectible connector 23 connected to one of the terminals at one end of a strap of several conductors 24 connected at its opposite end to the electrical energisation circuit 12.

In general, the appendage portions 21*a* and the metal coating 21 are connected to the earth of rhe printer while each of the other eight cables 22 terminate respective appendage portions 20*a* of the metal coating 20 and is connected to one of the channels of the energisation circuit 12.

One of these channels is illustrated schematically in FIG. 2 and will be described in detail below.

The configuration of the metal coatings 20 and 21 and the relative connecting cables is such that an energisation voltage pulse may be applied to the ink column contained within each nozzle element 19.

More specifically, this energisation pulse is applied between the mass of conductive ink which is in contact with the metal coating 21 and the corresponding metal coating 20 which surrounds the outlet end of the nozzle 19 itself.

The ejection of ink through the nozzles 19 is achieved by the application of a positive voltage pulse of between 1.5 kV and 3 kV to one of the metallised tracks 20 while the metal coating 21 is kept at the earth level in contact with the conductive ink which is within the corresponding nozzle 19 and forms, as will be more fully described below, a concave meniscus. The voltage pulse induces an ohmic type current in the ink, the current density being a maximum in the outlet region of the nozzle 19 where the cross section of the nozzle is a minimum. In this region, therefore, there is a high current density with a consequent evolution of heat. The heat produces instantaneous vapourisation of a layer of ink within the nozzle generating a pressure pulse within the nozzle itself. This pulse causes the emission of ink droplets which are projected at the printing surface S forming a mark or dot thereon of a diameter between 0.1 and 0.3 mm.

As a result of the said vapourisation a mass of gas in the form of small bubbles is generated at the the end of the nozzle 19 opposite the printing surface S, by a mechanism which is not completely clear.

The problem of the evacuation of these gas bubbles from the ink mass and from the body of the head 11 is an important aspect of the present invention which will be explained in greater detail below.

If we turn to the problem of the application of the energisation voltage pulses to the nozzles 19, it will be understood that it is necessary to avoid the energisation of any of the other nozzles 19, causing the undesirable emission of ink sprays from the adjacent nozzles thereto. The problem posed is extremely pressing since the energisation voltages applied between each metallised track 20 and the metal coating 21 may reach values of the order kilovolts and the distance separating the nozzles 19 is very small.

This problem is solved in the present invention by the choice of a topological configuration for the conductive tracks 20 which minimises the capacitive couplings between the said tracks.

Furthermore a further layer 25 of insulating material such as a vitreous ceramic is applied to the surface of the substrate 18 carrying the metal coatings 20, for example by a silk screen printing process.

The insulating layer 25 has, so to speak, the effect of increasing the distance in air which separates two adjacent nozzles, reducing the interference or "crosstalk" occuring between them in operation as a result of the limited distance between the metal coatings 20.

The insulating layer 25 is also an ink-repellent protective layer. It thus avoids ink being deposited on the front face of the head 11 which would give rise to the formation of clots which could clog the nozzles.

The wall member 17 is made by the deposition of the metal coatings 20 and 21 initially on the two opposite faces of the alumina substrate 18.

Subsequently, the vitreous ceramic layer 25 is deposited on the surface intended to face the printing surface S. The final manufacturing phase is that which results in the opening of the nozzles 19. This operation is carried out by means of a laser beam which is made to impinge on the surface of the substrate 18 opposite the face on which the metal coatings 20 and the vitreous ceramic protective layer 25 are provided.

The action of the laser beam results in the formation of nozzles with a frusto-conical shape each of which extends through the substrate 18, through one of the metal coatings 20 and through the protective vitreous ceramic layer 25.

Working with a laser allows high precision to be obtained in the relative disposition of the nozzles 19 with an accurate control of the dimensions thereof.

Typically the ends of each nozzle 19 comprise a rear end with a diameter of the order of 100–120 microns and a front end or outlet with a diameter of between 20 and 35 microns.

The overall length of the nozzle, determined substantially by the thickness of the substrate 18, is of the order of 0.2 mm.

The thickness of the substrate 18 is normally selected to correspond with a minimum value compatible with the structural rigidity of the wall element 17. The use of a thin substrate 18 in fact allows the axial extent of each nozzle, and consequently the electrical resistance of the ink retained by capillarity within it, and hence the voltage needed to emit the ink, to be reduced to a minimum.

Resistance values which are too high do not in fact allow a rapid fall in the energisation voltage after the emission of the ink and have a negative effect both on the speed of operation of the head (dot rate) and on the quality of the printing in that they give rise to secondary electrical discharges within the bubbles in the ink column which collects by capillarity within the nozzle 19.

As a further direct measure for minimising the electromagnetic interference between the operating circuits for adjacent nozzles, the cables of the strap 24 and possibly also the cables 22 which extend from the connector 23 to the element 17 are arranged in a linear array in which, for each pair of cables 22 connected to "hot" metal coatings 20 there is a neutral cable 22*a* connected to the electrical earth of the printer.

With reference to the other embodiment illustrated in FIGS. 8 and 9, which relates to a head for colour printing, it can be seen that the wall element 117 has a structure substantially identical to that of the wall element 17 described above.

As illustrated in FIGS. 10 and 12, the wall element 117 includes essentially a substrate 118 of insulating material such as alumina, through which pass nozzles 119 made by piercing with a laser beam.

Metal coatings 120 and 121 are provided on the two surfaces of the substrate 118. Again in this case the metal coatings 120 are constituted by conductive tracks each of which extends from the edge of the substrate 118 towards the outlet end of one of the nozzles 119.

The metal coatings 121 intended to come into contact with the mass of the ink extend however on the other surface of the substrate 118 in a closed path surrounding the rear ends of the nozzles 119.

The metal coatings 120 and 121 have appendage portions indicated 120*a*, 121*a* respectively defining contact sufaces for the cables 22 terminating at the connector 23.

In this case also a vitreous ceramic protective layer 125 is provided on the surface of the substrate 118 intended to face the printing surface S.

In the embodiment illustrated, since the nozzles 119 are sufficiently spaced apart, each of the nozzles 119 extends only through the substrate 118 and the respective metal coating 120.

At the outlet ends of the nozzles 119, the protective vitreous ceramic layer 125 has apertures or windows 125*a* of a square or circular section which surround the outlet ends of the nozzles 119 thus facilitating their formation.

The protective layer 125 may be applied to the wall element 117 even after the opening of the nozzles 119, which are again made in this case by piercing the substrate 118 and the metal layers 120 by laser radiation.

As indicated above, the body 13 of the head 11 in FIGS. 3 and 4, which is a monochromatic or black and white printing head, defines a single chamber for the conductive ink acting as a supply reservoir for all the nozzles 19.

The partitions 15 indeed have the exclusive purpose of damping inertial movements of the ink within the body 13, and as may be deduced from the presence of the angular windows 15*a*, do not effect true separation of the interior of the body 13 into distinct compartments.

The partitions 115 provided in the body of the head 11 of FIGS. 8 and 9, on the contrary, divide the interior of the body 13 itself into four compartments each of which communicates with only one of the nozzles 119 and is filled with ink of a different colour from that of the inks in the other compartments. In order to ensure separation between the different coloured inks, the partitions 115 extend into contact with the surface of the substrate 118 on which the metal coatings 121 are provided. The substrate 118 is connected to the side walls of the body 13 and the front edges of the partitions 115 by glueing with a material such as a resin, ensuring fluid-tight sealing between the different compartments in the body 13.

The nozzles 119 are aligned in the direction of printing of the device, that is to say in the horizontal direction of movement of the head 11 relative to the printing surface S.

The arrangement is thus such that each of the areas of the printing surface S exposed to the action of one one of the nozzles 119 is also exposed to the action of the other nozzles.

This arrangement, together with the availability of three coloured inks as well as the normal ink for printing in black and white, allows the achievement of printing of any colour obtained from the colours of the ink available according to a chromatic synthesis process. For example, when inks corresponding to the colours red-magenta, yellow and cyano are available it is possible to effect printing in green by making the nozzle 119 which projects yellow ink and the nozzle 119 which projects cyan ink act on each printing area of the surface S.

The chromatic synthesis may be achieved by synchronising the operation of the electrical energisation circuit 12 with the printing movement of the head 11 so that the three nozzles 119 which eject the coloured inks act successively over the same printing area, inks of different colour being superimposed on this area.

The synchronisation of the operation of the nozzles 119 with the movement of the carriage 6 on which the head 11 is mounted may be achieved by techniques known to the expert in this field. These techniques will not therefore be described in detail.

The quality of the chromatic synthesis achieved by means of the successive printing operations effected on the same area with inks of different colours is directly influenced by the precision with which the same relative disposition can be reproduced between the area of the printing surface S which is subjected to the printing and the nozzles 119 which face it in sequence.

For this purpose, a projection 126 is provided on the front surface of the wall element 117, that is to say, on the surface provided with the coating of vitreous material 125, the projection being able to cooperate slidingly with the printing surface S against which the head 11 is biased as a result of the action exerted by the springs 4 on the pivoted arms 3.

The projection 126 thus acts as a shoe which keeps the head 11 at a rigorously constant distance from the printing surface S.

The projection or shoe 126 is normally constituted by a mass of vitreous material the same as or similar to the material of the layer 125 applied to the wall element 117 by a silk screen printing process. A shoe 26 substantially similar to the shoe 126 may usefully be provided on the front surface of the head 11 of FIGS. 3 and 4 in order to maintain the said head at a rigidly constant distance from the printing surface, ensuring a rigorously uniform and constant printing quality.

The shoes 26 and 126 typically have a thickness of the order of 0.1 mm. Their representation in FIGS. 3 and 8 is thus greatly exaggerated.

The electrical diagram in FIG. 2 illustrates one of the pilot channels of the energisation circuit 12, that is to say, the structure of one of the channels which allows energisation pulses to be applied between one of the metal coatings 20 and the metal coating 21 in FIGS. 5 and 6 and between one of the metal coatings 120 and the metal coating 121 of FIGS. 10 and 11.

The circuit of FIG. 2 which allows a repetition frequency of the energisation pulses of the order of 15 KHz to be achieved, is of the type illustrated in greater detail in FIGS. 7 and 9 of U.S. Pat. No. 4,502,054.

This pilot channel is connected to the electrical circuit constituted by the metal coatings terminating at each nozzle 19 or 119, schematically shown in the form of a resistance 28 and a capacitance 29 connected in parallel with each other.

The value of the resistance 28 is substantially identified by the resistance of the ink column present within the nozzle. For reasons indicated previously (to obtain a high spray frequency, elimination of secondary electrical arcs) this resistance is kept to a minimum by reducing the thickness of the substrate 18 or of the substrate 118 as much as possible, down to limits (about 0.2 mm) which are acceptable in terms of structural strength.

A transformer is generally indicated 30 the primary winding of which is connected to a voltage supply 32 which charges a capacitor 34 intended to provide an instantaneous high intensity current. The secondary winding of the transformer 30 is, however, connected to the electrodes of the nozzle (indicated by the equivalent circuit 28,29). A control circuit is generally indicated 39 for generating a pilot pulse which connects the primary of the transformer 30 to the earth of the energisation circuit.

In response, the secondary of the transformer 30 generates a voltage pulse which increases rapidly up to a maximum greatly in excess of a kilovolt.

The application of the energisation pulse causes the emission of a mass of ink by the nozzle which has been shown experimentally to be of the order of $0.4\times10^{-7}$ g and forms a dot having an area of the order of 0.05 $mm^2$ with a diameter typically of between 0.1 and 0.3 mm on the printing surface S.

The dimensions and/or the intensity of the dot formed on the printing surface S depends, other conditions being equal, on the energy supplied in the excitation pulse, whereby it is possible to graduate the printing intensity by regulating this energy.

This may be used in black and white printing to adapt the intensity of the printing to the density of the dot matrix forming the character to obtain bold face type effects.

In colour printing, the possibility of regulating the intensity of the printed dot allows substantially continuous gradation of the chromatic characteristics of the printing to be achieved. This is particularly important when the device according to the invention is used for the reproduction of histograms, diagrams or drawings in colour.

In the example of the circuit stage in FIG. 12, the energy of the energisation pulse for the nozzles 19, 119 may be regulated by interposing a voltage regulator 33 constituted, for example, by a resistance divider adjustable by a manual control **33*a*, between the supply 32 and the transformer 30**.

A wholly equivalent result may be achieved for example by alterating the duration of the signals applied to the input of the control circuit 39 for example through a circuit for adjusting the duration of the pilot pulse illustrated in broken outline and indicated 133 in FIG. 12. Other solutions may naturally be used with reference to the other circuit diagrams.

More particularly, instead of an adjusting arrangement on which it is possible to operate from the exterior by means of a control similar to that indicated by the reference **33*a*, it is possible to provide, within the energisation circuit 12, a logic which controls automatically the intensity of the energisation signals and the dimensions of the printed dots. For example, in colour printing with chromatic synthesis it is possible to alter the stages of assembly of the various nozzles 119** so that the dots of one of the chromatic components used for the printing are larger or smaller than the dots of the other chromatic components.

As indicated above, during the printing, at the rear ends of the nozzles 19, 119, that is to say at the ends facing inwardly of the body 13 of the head 11, gas bubbles form continually and diffuse towards the surface of the ink contained in the body 13 itself. Whenever the body 13 is sealed, with no way of communicating with the external environment other than the nozzles 19 or 119, the gas evolved in the form of bubbles (the overall volume of which is greater than the volume of ink expelled by the nozzles 19, 119 during the printing process), would cause a pneumatic overpressure within the body 13 itself, with the consequent undesirable expulsion of the ink through the printing nozzles.

In order to remedy this disadvantage, a further hollow body 43 is provided in the head 11 forming a gas evacuation chamber at the rear wall of the body 13, that is to say the end wall opposite the front wall element 17, this chamber 43 communicating with the interior of the body 13 through apertures 44 located above the free surface of the ink and protected from any backwash or spraying of the ink itself by a deflector surface 45.

In the black and white printer head of FIGS. 3 and 4 there may in general be provided a single aperture 44 since the compartments defined within the body 13 by the partitions 15 communicate freely with each other.

In the colour printing head of FIGS. 8 and 9 however the same number of apertures 44 are provided as the number of compartments defined by the partitions 115.

In the illustrated embodiment in which compartments are provided for coloured inks and there is a further compartment for an ink for printing in black and white, there are four separate apertures 44. These apertures are located above the free surface of the ink in each compartment and thus do not allow any mixing of the different inks.

In both cases, the evacuation chamber 43 has, at about half its vertical height, a union 46 to which is connected one of the ends of a flexible tube 47 which can follow the printing movements of the head 11 and which is connected at its opposite end to the throat section of a venturi diffuser 48.

A fan 49 is associated with one end of the venturi diffuser 48 and is driven by an electric motor 50.

The rotation of the fan 49 causes a stable and uniform air flow within the diffuser 48. A low pressure is thus formed in the throat section indicated **48*a* which is applied to the chamber 43 through the flexible tube 47**.

The gas which forms within the body 13 during the printing is thus returned to the chamber 43 and sucked out by the venturi diffuser 48. The gas bubbles which form at the rear ends of the nozzles 19 and 119 are thus evacuated continuously, avoiding any harmful influence on the ink emission process through the nozzles 19, 119 themselves.

The value of the low pressure present within the evacuation chamber 43 may be adjusted very precisely and repeatably by adjusting the rate of rotation of the motor 50.

In particular, the value of the low pressure may be adjusted within the range of from −2 to −5 cm of water. The selection of this low pressure value allows a pressure to be established within each nozzle 19, 119 which results in the formation of a concave meniscus at the outlet end of each nozzle.

The presence of this meniscus, as well as avoiding accidental emission of ink through the nozzle, as envisaged theoretically above, also plays a determining role in the spray printing process.

Naturally, the principle of the invention remaining the same, details and embodiments may be varied widely with respect to those described and illustrated without thereby departing from the scope of the present invention.

I claim:

1. An ink jet printer including: a reservoir made of insulating material for an electrically conductive ink, at least one capillary nozzle communicating with said reservoir, a first electrode in contact with the conductive ink, a second electrode located at the outlet end of said nozzle and an electrical energization circuit for applying voltage pulses between the electrodes to cause an electric circuit in the ink of said nozzle, the density of said current in a portion of said nozzle having the smallest cross section being such as to create an instantaneous vaporization of part of said ink into the nozzle, which causes the ejection of ink droplets through the nozzle, and the introduction of the gas bubbles produced by said vaporization of said reservoir, wherein the improvements comprise:

a chamber for collecting the gas so introduced into a reservoir, said chamber communicating with said reservoir through said aperture, and means for evacuating the gas from said chamber.

2. Printer as defined in claim 1, wherein said evacuation means includes pump means associated with said chamber for generating a low pressure within the said chamber.

3. Printer as defined in claim 2, wherein the pump means include a Venturi diffuser having a throat section, a generator for generating a gas flow through the Venturi diffuser and a duct connecting the throat section of the Venturi diffuser with said chamber.

4. Printer as defined in claim 2, wherein the gas flow generator has adjustment means for varying the intensity of the gas flow in order to control the magnitude of the low pressure produced with said chamber.

5. Ink jet printer as defined in claim 1, including a plurality of said capillary nozzles, and further including a plate member defining a wall portion of the reservoir, said plate member comprising a laminar substrate of rigid electrically insulating material, metal coatings on the opposite faces of the substrate defining the said first and second electrodes for the plurality of nozzles and a further coating of vitreous material on the surface of said substrate facing outwardly of the printer.

6. Printer as defined in claim 5, in which the nozzles are defined by holes, each of which passes through the substrate, through one of the metal coatings provided on the face of the substrate facing outwardly of the printer, and through the said further coating of vitreous material.

7. Printer as defined in claim 5 or claim 6, wherein the substrate is constituted essentially by sintered alumina and has a thickness of substantially 0.2 mm in the region in which the nozzles are provided.

8. Printer as defined in claim 5, wherein the printer has eight said capillary nozzles arranged in an array comprising two parallel rows (columns) each of four nozzles spaced apart at equal distances; the nozzles of the two rows being relatively staggered by a distance equal to half the said distance between the nozzles of each row.

9. Printer as defined in claim 8, wherein the rows are spaced apart by a distance of substantially 1.27 mm while the said distance between the nozzles in each row is substantially 0.4 mm.

10. Printer as defined in claim 1, having at least one plurality of said capillary nozzles for printing in several colors, wherein the reservoir includes a plurality of separate compartments associated with said nozzles and liquid-tightly sealed from each other, each of which is filled with a different colored ink, a single said gas collecting chamber is provided, and a respective said aperture is provided above the free surface of the ink in each said compartment, communicating with said collecting chamber.

11. Printer as defined in claim 1, having a plurality of said capillary nozzles, a said first electrode in contact with the conductive ink, and a plurality of said second electrodes located in correspondence with the outlet ends of respective ones of the nozzles, wherein:

the reservoir includes a plurality of separate compartments liquid-tightly sealed from each other, each of which is filled with a different colored ink, the nozzles are aligned in the direction of printing of the printer and each communicates exclusively with one of said compartments, said reservoir being provided with a single gas collecting chamber, each of said compartments being provided with a relevant aperture above the free surface of the ink to communicate with said collecting chamber, and the electrical energization circuit includes separate energization stages for each nozzle in order to achieve the emission of ink sprays of different colors in correspondence with a single printing region, so as to achieve printing in this region with a color resulting from the chromatic synthesis of the colors of the inks ejected by the nozzles.

12. Printer as defined in claim 10 or claim 11, wherein four said compartments are provided in the reservoir, three of which receive inks of different colors corresponding to the basic colors of a chromatic triangle, while the fourth compartment is filled with an ink for black and white printing.

* * * * *